UNITED STATES PATENT OFFICE.

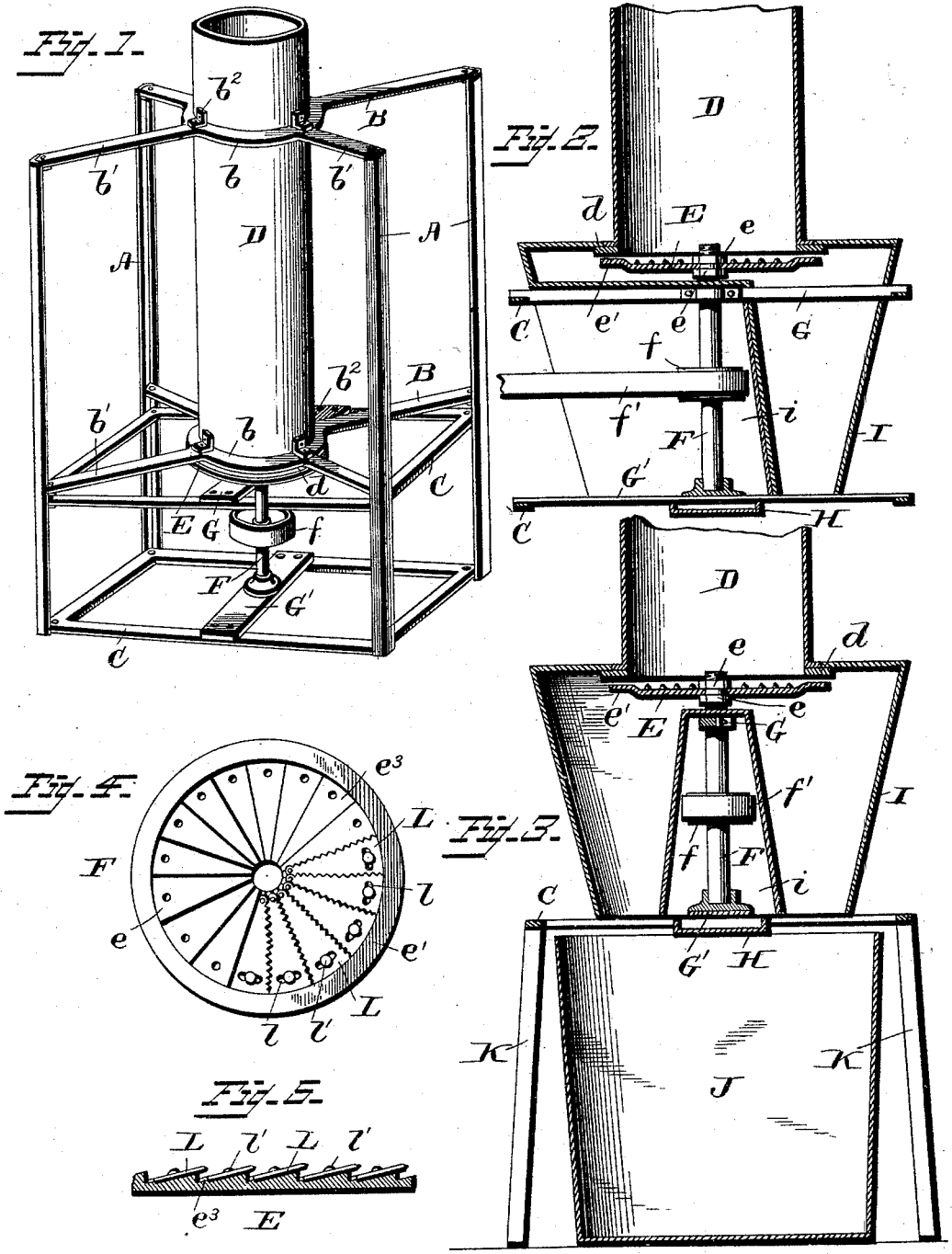

HERNDON ORLANDO BARLOW, OF DULUTH, MINNESOTA.

VEGETABLE SLICER AND GRATER.

SPECIFICATION forming part of Letters Patent No. 497,009, dated May 9, 1893.

Application filed August 20, 1892. Serial No. 443,594. (No model.)

*To all whom it may concern:*

Be it known that I, HERNDON ORLANDO BARLOW, a citizen of the United States, residing at Duluth, in the county of St. Louis, State of Minnesota, have invented certain new and useful Improvements in Vegetable Slicers and Graters; and I do hereby declare the following to be a full, clear, and exact description of the invention, such as will enable others skilled in the art to which it appertains to make and use the same.

My invention relates to vegetable slicers and graters of that class in which the substance to be reduced is placed in a hopper and gravitates to a rotating cutting disk.

The object of the invention is to improve the general construction of this class of machines whereby their efficiency and usefulness are increased.

The improvement consists of the novel features and the peculiar construction and combination of the parts which will be hereinafter more fully described and claimed, and which are shown in the annexed drawings, in which—

Figure 1 is a perspective view of a machine embodying my invention, the lower hopper being removed to show the vertical shaft to which the power is applied for rotating the cutting disk. Fig. 2 is a vertical central section of the machine, the frame being removed and the upper portion of the hopper being broken away. Fig. 3 is a view at right angles to Fig. 2, showing the support for the machine and a receptacle to receive the substance after it has been sliced or grated. Fig. 4 is a top plan view of the preferred form of cutting disks. Fig. 5 is a detail edge view of the said cutting disk shown in Fig. 4.

The frame for supporting the operating parts of the machine is composed of four corner posts A, two spiders B, and two rectangular frames C. The corner posts are preferably of metal and are L-shaped in cross section, and have angular filling pieces opposite the points of attachment therewith of the spiders B and the rectangular frames C, the latter being fitted in the angular space and suitably secured to the angular filling pieces. The spiders, two being provided, one located above the other, comprise an annulus $b$ and four arms $b'$ radiating therefrom to the four corner posts A. The hopper D which is adapted to receive the substance to be reduced, is inserted in the ring $b$ and is secured to said ring by angle straps $b^2$. The lower end of the hopper D is turned outward and supports a metal ring $d$ which is secured to said out turned portion of the hopper by suitable fastening devices.

The cutting disk E secured to the upper end of the vertical shaft F between two adjusting nuts $e$ which are mounted upon the threaded end of said shaft F, has its central portion depressed and provided with the cutting teeth. The rim portion $e'$ of said cutting disk is raised and is constructed to overlap a portion of the metal ring $d$. Between the portions $d$ and $e'$ an escape is provided for the discharge of the substance after it has been reduced to the proper degree of fineness. By reason of the upper end of the shaft F being threaded and the cutting disk being held on said threaded end between the two nuts $d$ the said cutting disk can be adjusted relatively to the lower end of the hopper to regulate the size of the discharge opening between the metal ring $d$ and the rim portion $e'$. The shaft F has bearing in the cross beams G and G' which are secured at their ends to the side bars of the frame C. A band wheel $f$ is located on the shaft F to receive the driving belt $f'$ which is operated or driven from a suitable source of power to rotate the cutting disk E in the operation of the machine. A drip pan H is located beneath the lower cross bar G' to catch the drippings from the bearings of the shaft F and prevent the same from mixing with the reduced substance. The lower hopper I is made tapering and is sufficiently large at its upper or receiving end to encircle the lower end of the hopper D and receive the substance in its reduced condition as it escapes from the hopper D. The lower portion of the hopper I is depressed as shown at $i$, to give clearance for the cross beams G and G' and the shaft F, thereby preventing the substance from contact with the said parts. This construction also admits of the belt $f'$ passing around the band pulley $f$ without coming in contact or interfering with the free discharge of the reduced substance.

In the application of the invention the machine is supported on a suitable stand K and over a receptacle J which is provided to receive the sliced or grated substance. The substance to be grated or sliced is placed in the hopper D and gravitates to the cutting disk E. The pressure of the substance in the upper portion of the hopper on that contained in the lower portion of said hopper forces the substance in the lower portion of said hopper upon the said cutting disk by which it is reduced, and causes the reduced mass to escape through the discharge opening formed between the parts $d$ and $e'$ as hereinbefore stated.

The cutting teeth on the cutting disk may be of any approved form either for purposes of slicing or grating. In Figs. 4 and 5 a preferred form of construction is shown, the same consisting of tapering blades L which are pivotally connected at their inner ends to the disk E and have their outer ends slotted as shown at $l$ to receive a binding screw $l'$ by means of which said blades are adjustably secured to the cutting disk E. These blades are arranged so that their front or cutting edges are raised a slight distance above the plane of said disk E and have their rear portions inclining to the plane of said disk E, thereby giving clearance for the cuttings in front of each blade. The front edges of the blades L may be straight. This will be the form of construction for slicing, but it is preferred to provide said cutting edges with a series of teeth as shown in Fig. 4, which greatly facilitates the operation of the machine.

To give the proper pitch to the blade L it is proposed to construct the upper side of the disk E with a series of inclined faces $e^3$ which will form seats for the said blade, as most clearly shown in Fig. 5.

Having thus described my invention, what I claim, and desire to secure by Letters Patent, is—

1. In a machine for the purposes specified, the combination with a hopper to receive the substance to be reduced, and provided with an outwardly extending ring at its lower end, and a vertical shaft capable of rotation, of a cutting disk mounted on said shaft and having its rim portion elevated and overlapping the outwardly extending ring at the lower end of the hopper, and means for vertically adjusting said cutting disk independently of the shaft, to vary the discharge opening formed between the said ring and the elevated portion of the cutting disk, substantially as and for the purpose set forth.

2. A cutting disk having a series of radially disposed faces or seats tapering in width, and set on an incline from one edge, and a corresponding series of tapering blades placed upon the said seats and pivotally attached thereto at the inner ends, and having slots at their outer ends, and binding screws for adjustably securing the said blades to the said seats, substantially as and for the purpose described.

In testimony whereof I affix my signature in presence of two witnesses.

HERNDON ORLANDO BARLOW.

Witnesses:
S. M. LOCKERBY,
B. F. BENSON.